United States Patent
Schwefer et al.

(10) Patent No.: US 7,906,091 B2
(45) Date of Patent: Mar. 15, 2011

(54) REMOVAL OF LAUGHING GAS IN NITRIC ACID PRODUCTION

(75) Inventors: Meinhard Schwefer, Meschede (DE); Rainer Maurer, Schwelm (DE); Thomas Turek, Düsseldorf (DE)

(73) Assignee: Uhde GmbH, Dortmund (DE)

( * ) Notice: Subject to any disclaimer, the term of this patent is extended or adjusted under 35 U.S.C. 154(b) by 2010 days.

(21) Appl. No.: 10/181,120

(22) PCT Filed: Jan. 9, 2001

(86) PCT No.: PCT/EP01/00158
§ 371 (c)(1), (2), (4) Date: Jan. 8, 2003

(87) PCT Pub. No.: WO01/51415
PCT Pub. Date: Jul. 19, 2001

(65) Prior Publication Data
US 2004/0105803 A1    Jun. 3, 2004

(30) Foreign Application Priority Data

Jan. 14, 2000 (DE) .................................. 100 01 540

(51) Int. Cl.
B01D 53/02 (2006.01)
C01B 21/22 (2006.01)

(52) U.S. Cl. ............... 423/239.2; 423/235; 422/168; 422/173; 422/177; 502/64; 502/66; 502/71; 502/74; 502/77

(58) Field of Classification Search .................. 423/235, 423/239.2, 239.5; 422/168, 173, 177; 502/64, 502/66, 71, 77, 74
See application file for complete search history.

(56) References Cited

U.S. PATENT DOCUMENTS

| | | | |
|---|---|---|---|
| 4,305,919 A | 12/1981 | Roller | 423/392 |
| 5,178,101 A | 1/1993 | Bell | 122/4 D |
| 6,056,928 A * | 5/2000 | Fetzer et al. | 423/235 |
| 6,534,029 B1 * | 3/2003 | Klein et al. | 423/392 |

FOREIGN PATENT DOCUMENTS

| | | |
|---|---|---|
| DE | 19805202 | 2/1999 |
| EP | 0 756 891 | 2/1997 |
| JP | 6-165919 | * 6/1994 |
| WO | WO 97/10042 | * 3/1997 |
| WO | 99/49954 | 10/1999 |

OTHER PUBLICATIONS

Thiemann et al, "Nitric ACid, and Nitrogen Oxides", pp. 1-49 (2005) (Ullmann's).*

* cited by examiner

*Primary Examiner* — David M Brunsman
(74) *Attorney, Agent, or Firm* — Connolly Bove Lodge & Hutz LLP

(57) ABSTRACT

A method and device for removal of $N_2O$ in nitric acid production are disclosed. The device is arranged after a heat exchanger, post ammonia burning, before the absorption tower and contains a catalyst, which essentially comprises one or several iron loaded zeolites.

12 Claims, 1 Drawing Sheet

Diagram of inventive $N_2O$ reduction

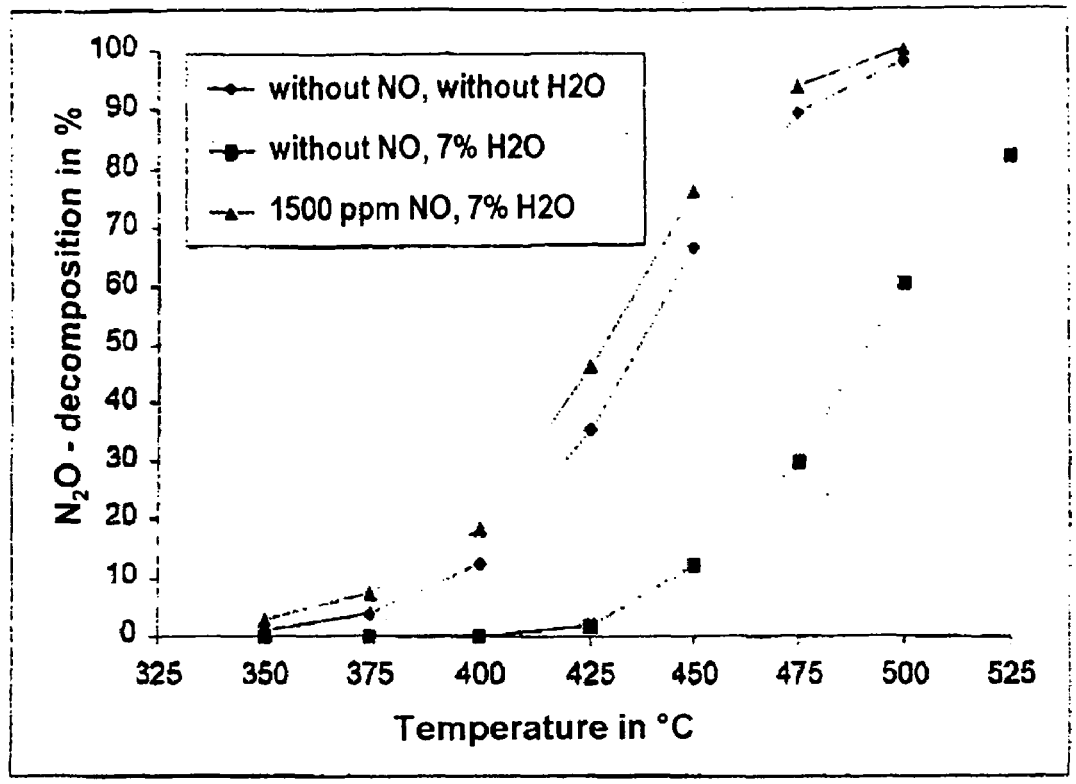
Fig. 1: Decomposition of $N_2O$ over Fe-ZSM-5
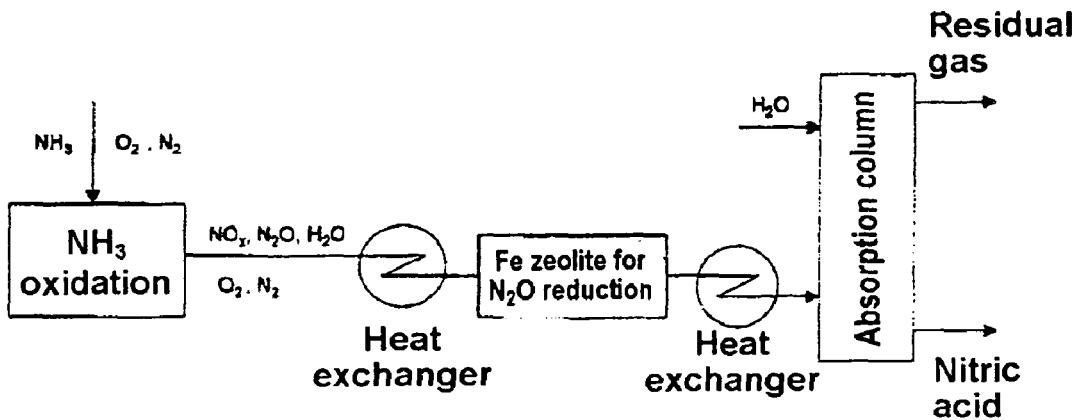
Fig. 2: Diagram of inventive $N_2O$ reduction

REMOVAL OF LAUGHING GAS IN NITRIC ACID PRODUCTION

During ammonia oxidation in the course of nitric acid production, nitrous oxide $N_2O$, which is not desired, is produced alongside the desired nitrogen monoxide NO. $N_2O$ makes a considerable contribution to decomposing ozone in the stratosphere and to the greenhouse effect. After reduction of nitrous oxide emissions from the adipic acid industry, nitric acid production is the largest source of industrial nitrous oxide emissions. For environmental protection reasons there is therefore an urgent need for technical solutions for reducing nitrous oxide emissions during nitric acid production. Ullmann's Encyclopedia of Industrial Chemistry; Vol. A 17, VCH Weinheim (1991) gives an overview of the nitric acid production sequence and the various versions of that process.

One promising method of removing $N_2O$ from industrial waste gases is the decomposition of $N_2O$ into the elements nitrogen and oxygen, with the aid of a suitable catalyst.

There are numerous proposals for eliminating $N_2O$ during $HNO_3$ production, mostly based on catalytic decomposition of $N_2O$ between the Pt mesh and the first heat exchangers.

For example, U.S. Pat. No. 4,973,457 describes a process for eliminating dinitrogen oxide formed during $NH_3$ combustion, by retention of the gases for from 0.1 to 3 seconds prior to their cooling. According to the process which it describes, up to 90% of $N_2O$ is decomposed into $N_2$ and $O_2$. An alternative given is that the gases may also be brought into contact with a metallic or metal-oxide catalyst for selective decomposition and to reduce retention time.

DE-A-19 805 202 discloses a process for nitric acid production in which, to avoid release of nitrous oxide, the reaction gases downstream of the platinum mesh are passed, prior to cooling, over a heat-resistant catalyst for conversion of the $N_2O$ present in the reaction gases. This catalyst is exposed to extreme heat stress at from 800 to 1000° C., this being the temperature prevailing immediately after discharge of the reaction gases from the catalyst mesh. Preferred catalysts used are precious metals or ceramics.

DE-A-198 19 882 A1 likewise describes a process for the catalytic decomposition of $N_2O$, in which the reaction gases from ammonia combustion are passed, prior to cooling, i.e. prior to contact with a heat exchanger, over a catalyst which is preferably composed of 8% by weight of CuO, 30% by weight of ZnO, and 62% by weight of $Al_2O_3$. The residence time for $N_2O$ decomposition is preferably <0.1 seconds.

U.S. Pat. No. 5,478,549 claims a process for preparing NO by oxidizing ammonia on catalysts of platinum group metals, in which the undesired $N_2O$ produced is first passed together with the reaction gas over a scavenger system to reclaim volatile platinum group metals, and then, to decompose $N_2O$, over a catalyst bed made from zirconium oxide. The temperature of the bed is to be $\geq 600°$ C.

An arrangement directly downstream of the Pt meshes therefore appears particularly desirable, since in the ideal case it is simply necessary to exchange the bed of Raschig rings downstream of the Pt meshes for an appropriate catalyst bed. However, a disadvantage is the extreme conditions. Temperatures around 900° C., water contents in the range of 17%, and NO contents of 10% place high requirements not only on the activity and selectivity of the catalyst but also on its mechanical and thermal stability. In addition, the Pt burn-off from the Pt meshes can also precipitate on the catalyst bed and reduce selectivity of $N_2O$ decomposition by additionally causing decomposition of the desired oxidation product NO (Boudart et al., Journal of Catalysis 39, (1975), 383-394).

If appropriate catalysts are arranged in the residual gas which leaves the absorption column with a temperature of from 20 to 30° C., water content is restricted to from about 0.2 to 2%, depending on the version of the process, and NO content is about 1000 ppm. The maximum temperature for the operation of the $DeN_2O$ catalyst is prescribed by the respective inlet temperature for the residual gas turbine, and this severely limits the choice of suitable catalysts.

Of the numerous catalysts which have been demonstrated to be suitable in principle for decomposing and reducing nitrous oxide (Kapteijn et al.; Appl. Cat. B; Environmental 9 (1996), 25-64), mention should be made, inter alia, of transition-metal-loaded zeolite catalysts (U.S. Pat. No. 5,171,553), the potential usefulness of which for reducing the amount of $N_2O$ during nitric acid production is also mentioned by Kapteijn.

The activity of iron-containing zeolites, e.g. Fe-ZSM-5, for decomposing $N_2O$ is increased in the presence of appropriate amounts of NO, and this is attributed to a reaction forming $NO_2$ by the route $NO+N_2O \rightarrow N_2+NO_2$, catalyzed by Fe-ZSM-5 (Kapteijn et al., Journal of Catalysis 167 (1997), 256-265).

In accordance with this theory it is pointed out that these catalyst could be used to eliminate $N_2O$ from the residual gas from nitric acid production, which comprises approximately equal parts of NO and $N_2O$. However, the practical use of these iron-containing and copper-containing zeolites is likely to be problematic, since the reference expressly points out that they are deactivated under hydrothermal conditions. The zeolites described in that reference were prepared by ion exchange in aqueous solutions and are stated by Kapteijn to have the activity sequence Cu>Co>Fe.

WO 99/34901 also relates to iron-containing zeolites based on ferrierite for the reduction of $N_2O$-containing gases. The catalysts used in that reference comprise from 80 to 90% of ferrierite, and also binders. The water content of the gases to be reduced is in the range from 0.5 to 5% by volume. In a comparison of various zeolite types, the best results for $N_2O$ decomposition at temperatures of from 375 to 400° C. were obtained with zeolites of FER (ferrierite) type (97% $N_2O$ decomposition at 375° C. with an $NO/N_2$) ratio of 1). Substantially less decomposition was observed using zeolites of pentasil (MFI) type or mordenite (MOR) type. Indeed, under the above conditions the maximum $N_2O$ decomposition achieved using iron-loaded MFI zeolites was 62%.

There is no description in the known prior art hitherto of any apparatus whose arrangement is between the heat exchangers of the waste heat boiler associated with $NH_3$ combustion and the absorption column, and which has adequate catalytic activity at temperatures of up to 600° C., at NOx content of about 10%, and at water content of about 17%.

These large amounts of water vapor are particularly problematic for the use of catalysts at relatively low temperatures when compared with the arrangement of the catalysts upstream of the first heat exchangers of the waste heat boiler.

For example, the conversion in $N_2O$ decomposition over a Co-ZSM-5 catalyst at 520° C. and an $H_2O$ partial pressure of 13.5 kPa (corresponding to 5.4%) falls from about 76% (without water) to about 16%; for Fe-ZSM-5 at 560° C. the activity loss recorded is from about 86% to about 40% (Kapteijn et al., Studies in Surface Science and Catalysis 101 (1996), 641-650).

It is therefore an object to provide an apparatus which can be used during nitric acid production to remove $N_2O$ from the reaction gases and which permits economic operation of the process, comprises catalysts which even under hydrothermal reaction conditions have adequate catalytic activity, and guarantees high levels of $N_2O$ decomposition. The manner of insertion of the arrangement into the process should preferably be such that the reaction gases are at the appropriate temperature level prior to entry into this arrangement, so that no heating of the catalyst is required.

The present invention achieves this object and provides an apparatus for eliminating $N_2O$ during nitric acid production which has been arranged downstream of a heat exchanger after ammonia combustion and upstream of the absorption column and includes a catalyst which is substantially composed of one or more iron-loaded zeolites.

In another embodiment, the present invention provides a process for removing $N_2O$ during nitric acid production, bypassing the reaction gas from ammonia combustion over a catalyst which is substantially composed of one or more iron-loaded zeolites, the arrangement of the catalyst being such that its location is downstream of a heat exchanger associated with ammonia combustion but upstream of entry into the absorption column.

If the plant for nitric acid production comprises two or more heat exchangers after ammonia combustion, the location of the apparatus of the invention is in the region downstream of the first heat exchanger and upstream of the entry into the absorption column. It is also possible for two or more apparatuses of the invention to have been arranged in this region. The location of the apparatus is preferably downstream of a heat exchanger, the temperature level of the reaction gas being in the region of 350 and 600° C.

Catalysts used according to the invention are composed substantially of one or more iron-loaded zeolites, preferably of >50% by weight, in particular of >70% by weight. This means that, for example, the catalyst used according to the invention may comprise, alongside an Fe-ZSM-5 zeolite, another iron-containing zeolite, e.g. an iron-containing zeolite of the MFI type or MOR type. In addition, the catalyst used according to the invention may comprise other additives known to the skilled worker, e.g. binders. It is preferable for iron to be introduced into the zeolites by solid-phase ion exchange. The starting materials usually used for this purpose are the commercially available ammonium zeolites (e.g. $NH_4$-ZSM-5) and the appropriate iron salts (e.g. $FeSO_4 \times 7H_2O$), these being mixed intensively with one another by mechanical means in a bead mill at room temperature. (Turek et al.; Appln. Catal. 184, (1999) 249-256; EP-A-0 955 080). These citations are expressly incorporated herein by way of reference. The resultant catalyst powders are then calcined in air at temperatures in the range from 400 to 600° C. in a furnace. After calcination, the iron-loaded zeolites are washed thoroughly in distilled water and the zeolite is filtered off and dried.

Finally, the resultant iron-containing zeolites are treated with the appropriate binders and mixed, and, for example, extruded to give cylindrical catalyst bodies. Suitable binders are any of the binders usually used, the most commonly used here being aluminum silicates, such as kaolin.

According to the present invention, the zeolites which may be used are iron-loaded zeolites. The iron content here, based on the weight of zeolite, may be up to 25%, but preferably from 0.1 to 10%. Particularly suitable zeolites here are those of type MFI, BETA, FER, MOR, and/or MEL. The Atlas of Zeolithe Structure Types, Elsevier, 4th revised Edition 1996, gives precise information on the build or structure of these zeolites, and is expressly incorporated herein by way of reference. According to the invention, preferred zeolites are of MFI (pentasil) type or MOR (mordenite) type. Zeolites of Fe-ZSM-5 type are particularly preferred.

Surprisingly, it has now been found that the favorable effect described in the prior art of NO on the decomposition of $N_2O$ on iron-containing catalysts as given by $NO+N_2O \rightarrow N_2+NO_2$ is also active in the presence of large amounts of water vapor, and the water-vapor deactivation described in the literature for catalysts of this type can therefore be more than compensated by the simultaneous presence here of NO. FIG. 1 illustrates this effect in the decomposition of 1000 ppm of $N_2O$ in the presence of NOx and $H_2O$. It has been found that the presence of even 1500 ppm of NOx is sufficient to achieve complete decomposition of 1000 ppm of $N_2O$ at 500° C. even when 7% by volume of $H_2O$ are simultaneously present in the reaction gas stream (cf. also Example 3). Of course, a further excess of NOx, as usually present in the reaction gas from ammonia combustion during nitric acid production, does not impair NOx decomposition but instead brings about a further lowering of the reaction temperature. For example, as illustrated in Examples 6-8, the deactivating action of 18% by volume of water is almost completely eliminated by the presence of 10% by volume of NO, at an operating temperature of 450° C.

To remove the $N_2O$ produced during nitric acid production, the reaction gas from ammonia combustion is passed over the catalyst arrangement of the invention, this having been arranged in such a way that its location is downstream of a heat exchanger after ammonia combustion, but nevertheless upstream of entry into the absorption column. On entry into the apparatus the temperature of the reaction gas is <600° C. and its $NO_x$ content (where x=from 1 to 2) is from 3 to 17% by volume, preferably from 6 to 14% by volume. The $N_2O$ content of the gas on entry into the apparatus is usually up to 3000 ppm. The operating pressure for the apparatus should be in the range from 1 to 15 bar, preferably from 1 to 12 bar, in order to achieve satisfactory decomposition of $N_2O$.

The reaction gas is preferably passed with a space velocity in the range from 2000 to 200,000 $h^{-1}$, in particular from 5000 to 50,000 $h^{-1}$, over the catalyst.

The process of the invention therefore permits decomposition of >90%, preferably >95%, in particular 100 percent decomposition of $N_2O$, even in the presence of high water contents, at temperatures in the range from 350 to 600° C. and in particular from 400 to 550° C., and with water contents in the range from 5 to 25% by volume, preferably from 10 to 20% by volume, in the reaction gas.

$N_2O$ content of the reaction gas after passage through the apparatus of the invention is therefore usually in the range from 0 to 100 ppm.

$NO_2$ formed as in the equation $NO+N_2O \rightarrow N_2+NO_2$ is passed onward, after leaving the arrangement of the invention, into the absorption column, and there directly utilized for $HNO_3$ generation.

The arrangement of the invention eliminates any additional heating of the gas stream or of the catalyst bed, since the reaction gases are at the appropriate temperature level before they enter the apparatus.

The arrangements described in the prior art operate at markedly higher temperatures than 600° C., this being the result of the deactivating action of $H_2O$ content. Associated with this is the problem of simultaneous NO decomposition and that of the long-term stability of the catalysts. Using the arrangement of the invention and the process of the invention it is possible to achieve a high level of $N_2O$ decomposition despite high water content, without any significant fall-off in catalyst activity.

In addition, the low operating temperature and the nature of the catalyst mean that simultaneous NO decomposition is negligible.

The problem described in the abovementioned prior art of Pt deposits on the catalyst is also eliminated, since the arrangement of the invention is not directly below the Pt meshes.

BRIEF DESCRIPTION OF THE DRAWINGS

FIG. 1 is a graph showing the percent decomposition of $N_2O$ over Fe-ZSM-5 as a function of temperature.

FIG. 2 shows a diagram of an N₂O reduction process according to the present invention.

The examples below are used to illustrate the invention.

EXAMPLES

Examples 1-8

The catalyst used comprised an iron-loaded zeolite of ZSM-5 type. The Fe-ZSM-5 catalyst was prepared by solid-phase ion exchange, starting from a commercially available ammonium-form zeolite (ALSI-PENTA, SM27). Detailed information on preparation may be found in: M. Rauscher, K. Kesore, R. Mönnig, W. Schwieger, A. Tißler, T. Turek: Preparation of highly active Fe-ZSM-5 catalyst through solid state ion exchange for the catalytic decomposition of N₂O, in Appl. Catal. 184 (1999), 249-256.

The catalyst powders were calcined in air for 6 hours at 823 K, washed, and dried overnight at 383 K. After addition of appropriate binders, the material was extruded to give cylindrical catalyst bodies (2×2 mm). These were used in Examples 1 to 5, while in Examples 6 to 8 use was made of corresponding pellets with grain size of from 1 to 2 mm.

The experiments were carried out in a flux apparatus operated in steady state and with on-line analysis, the space velocity in each case being 10,000 h⁻¹.

In each case the feed comprised 1000 ppm of N₂O and 2.5% by volume of O₂ (Examples 1 to 5) and, respectively, 5.5% by volume of O₂ (Examples 6-8) in N₂, and also varying amounts of H₂O and NO$_x$.

The following residual concentrations of N₂O were obtained while varying the amount of H₂O and NOx (x=from 1 to 2):

| Example | H₂O concentration in feed | NOx concentration in feed | Resultant N₂O concentration at 400° C. | Resultant N₂O concentration at 450° C. | Resultant N₂O concentration at 500° C. |
|---|---|---|---|---|---|
| 1 | 0% by vol | 0 ppm | 875 ppm | 335 ppm | 21 ppm |
| 2 | 7% by vol | 0 ppm | 995 ppm | 877 ppm | 369 ppm |
| 3 | 7% by vol | 1500 ppm | 816 ppm | 238 ppm | 0 ppm |
| 4 | 0.5% by vol | 0 ppm | 961 ppm | 735 ppm | 165 ppm |
| 5 | 0.5% by vol | 500 ppm | 604 ppm | 125 ppm | 13 ppm |
| 6 | 0% by vol | 0% by vol | 365 ppm | 7 ppm | |
| 7 | 18% by vol | 0% by vol | 915 ppm | 681 ppm | |
| 8 | 18% by vol | 10% by vol | 545 ppm | 20 ppm | |

What is claimed is:

1. An apparatus for removing N₂O from a reaction gas generated by the combustion of ammonia during nitric acid production, said apparatus being located upstream of an absorption column and downstream of at least one heat exchanger, wherein said at least one heat exchanger is positioned, in the direction of gas flow, after the combustion of ammonia, the at least one heat exchanger cools the gas originating from the combustion of ammonia resulting in a feed gas for N₂O decomposition having a temperature in the range of 350 to 600° C., an NO$_x$ content in the range of 3 to 17% by volume, and an H₂O content in the range of 5 to 25% by volume, and the apparatus for removing N₂O includes a catalyst which is substantially composed of one or more iron-loaded zeolites wherein x=from 1 to 2.

2. The apparatus as claimed in claim 1, wherein the iron loaded zeolite(s) present in the catalyst are of type MFI, BEA, FER, MOR or MEL or mixtures thereof.

3. The apparatus as claimed in claim 2, wherein the iron-loaded zeolite(s) are of MFI type.

4. The apparatus as claimed in claim 2, wherein the iron-loaded zeolite(s) is an Fe-ZSM-5.

5. A process for removing N₂O from a reaction gas generated by the combustion of ammonia during nitric acid production in which the reaction gas from the ammonia combustion passes over a catalyst wherein said catalyst is substantially composed of one or more iron-loaded zeolites, the catalyst being located upstream of an absorption column and downstream of at least one heat exchanger, wherein said at least one heat exchanger is positioned, in the direction of gas flow, after the combustion of ammonia, the at least one heat exchanger cools the gas originating from the combustion of ammonia providing a feed gas with a temperature in the range of 350 to 600° C., an NO$_x$ content in the range of 3 to 17% by volume, and an H₂O content in the range of 5 to 25% by volume, for N₂O decomposition wherein x=from 1 to 2.

6. The process as claimed in claim 5, wherein the reaction gas after passage over the catalyst has a N₂O content in the range from 0 to 100 ppm.

7. The process as claimed in claim 5, wherein the reaction gas is passed over the catalyst at a pressure in the range from 1 to 15 bar.

8. The process as claimed in claim 5, wherein the reaction gas is passed over the catalyst with a space velocity in the range from 2000 to 200,000 h⁻¹.

9. The process as claimed in claim 5, wherein the amount of N₂O removed from the reaction gas is >90%.

10. The process as claimed in claim 5, wherein the reaction gas passed over the catalyst has an NO$_x$ content in the range from 6 to 14% by volume.

11. The process as claimed in claim 5, wherein the reaction gas passed over the catalyst has a H₂O content in the range from 10 to 20% by volume.

12. The process as claimed in claim 5, wherein the amount of N₂O removed from the reaction gas is >95%.

* * * * *